United States Patent [19]
Higashiura et al.

[11] Patent Number: 6,167,017
[45] Date of Patent: Dec. 26, 2000

[54] OPTICAL HEAD ASSEMBLY HAVING MEANS FOR DETECTING TRACKING ERRORS BASED ON ASTIGMATISMS GENERATED BY RETURNING BEAMS

[75] Inventors: Kazuo Higashiura; Tadashi Takeda, both of Nagano, Japan

[73] Assignee: Sankyo Seiki Mfg. Co., Ltd., Nagano-ken, Japan

[21] Appl. No.: 09/078,911

[22] Filed: May 14, 1998

[30] Foreign Application Priority Data

May 15, 1997 [JP] Japan ..................................... 9-125128

[51] Int. Cl.[7] .......................................................... G11B 7/00
[52] U.S. Cl. ........................ 369/109; 369/112; 369/44.41; 369/44.23
[58] Field of Search ................................... 369/44.12, 109, 369/103, 110, 112, 44.23, 44.37, 44.41

[56] References Cited

U.S. PATENT DOCUMENTS

| | | | |
|---|---|---|---|
| 5,428,595 | 6/1995 | Yoshida et al. | 369/109 |
| 5,515,353 | 5/1996 | Miyazaki et al. | 369/109 |
| 5,594,712 | 1/1997 | Yang | 369/109 |
| 5,638,352 | 6/1997 | Yang | 369/109 |
| 5,828,643 | 10/1998 | Takeda et al. | 369/109 |

*Primary Examiner*—Nabil Hindi
*Attorney, Agent, or Firm*—Reed Smith LLP

[57] ABSTRACT

In accordance with the invention, an optical head assembly comprises a laser light source, an objective lens for converging light emitted from the laser light source onto an recording surface of an optical recording medium, an optical detector device for detecting the light reflected upon the recording surface, a modulating diffraction grating for splitting the light emitted from the laser light source into 0th-order beam, +1st-order beam and −1st-order beam in a track direction of the recording surface, emitting the three beams toward the center of the track of the recording surface, and causing, with respect to the +1st-order beam and −1st-order beam, astigmatisms of different focal points in a direction orthogonal to the track direction, and a light-guiding device for guiding three returning beams reflected from the recording surface to the optical detector device. The optical detector means is equipped with an optical detecting portion for detecting recording signals that receives the 0th-order beam of the three returning beams and an optical detecting portion for detecting tracking errors that detects tracking error signals based on the astigmatisms generated to the +1st-order beam and −1st-order beam of the three returning beams, astigmatisms having different focal points in the direction orthogonal to the track direction.

11 Claims, 4 Drawing Sheets

(A SIMPLE CONSTRUCTION OF AN OPTICAL SYSTEM)

(A DIFFRACTION GRATING)

(A MODULATING DIFFRACTION GRATING)

(A PATTERN IN A DETECTOR)

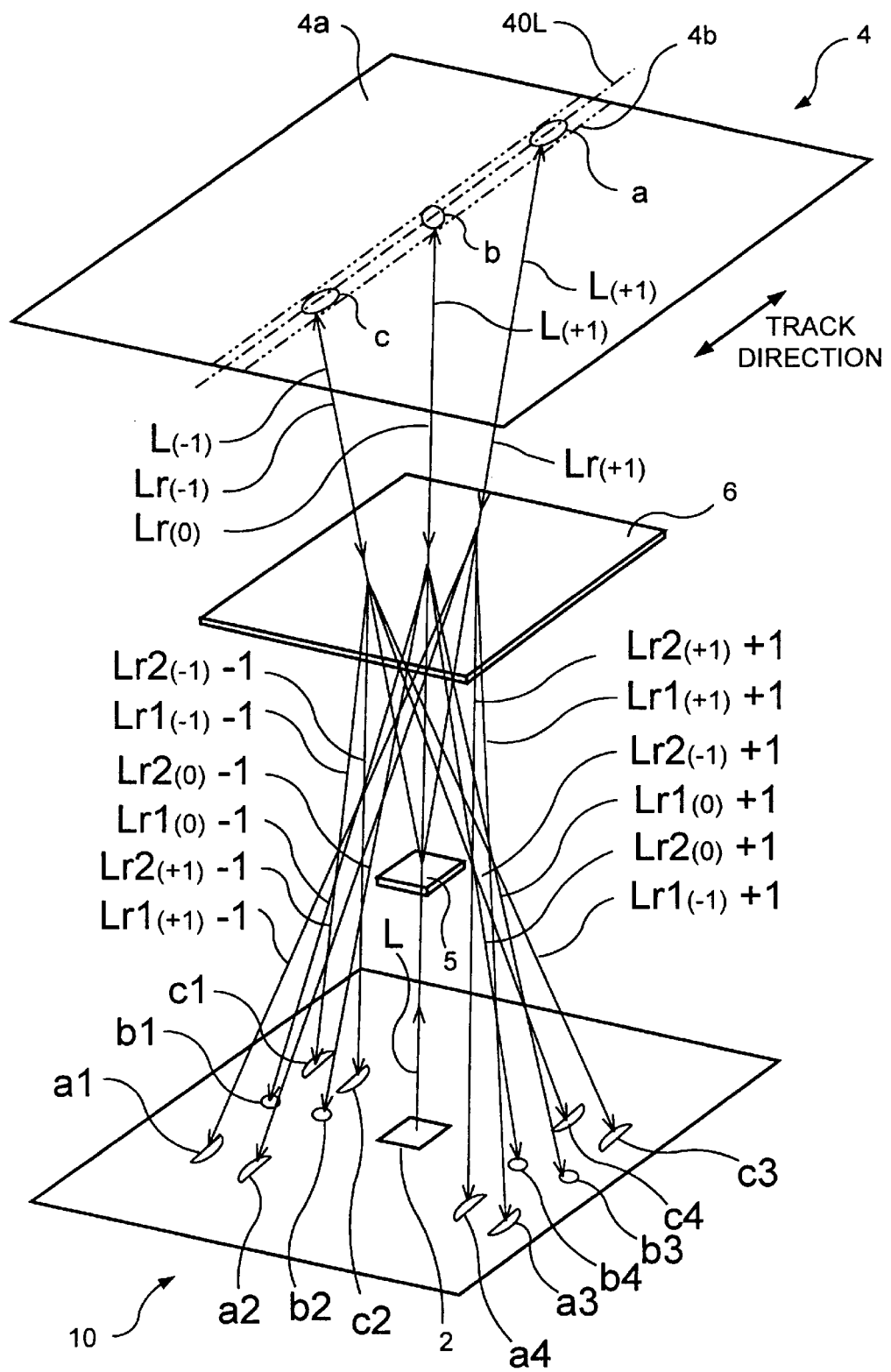
F I G. 2

(OPTICAL SPOTS ON THE TRACK)

(LIGHT BEAM IN MERRIDIONAL CROSS-SECTIONAL VIEW)

a: BACK FOCAL POINT
b: FOCAL POINT
c: FRONT FOCAL POINT (LIGHT BEAM IN SAGITTAL CROSS-SECTIONAL VIEW)

(ENERGY DISTRIBUTIONS OF AN OBJECTIVE LENS PUPIL PLANE)

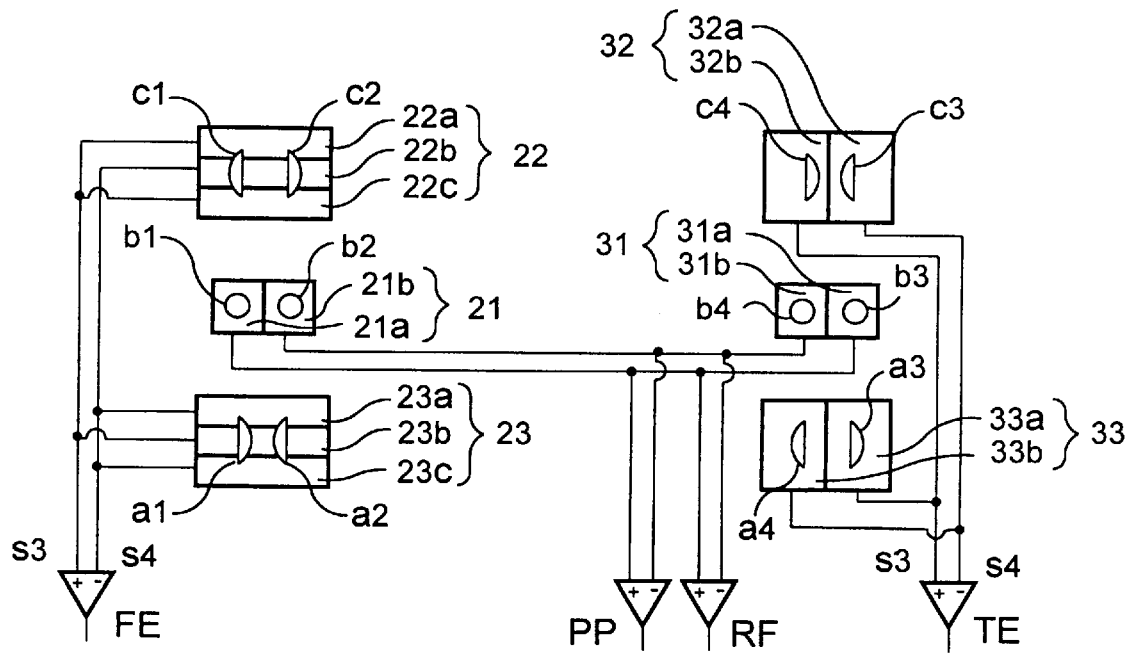
( OPTICAL SPOTS AND A THEORY OF SIGNAL DETECTION )
F I G. 4
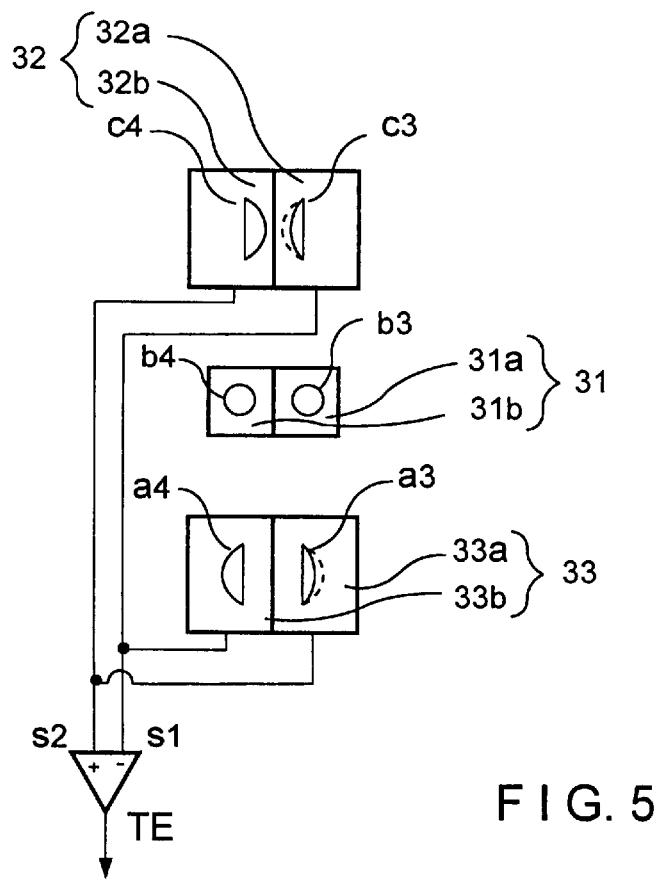
F I G. 5

OPTICAL HEAD ASSEMBLY HAVING MEANS FOR DETECTING TRACKING ERRORS BASED ON ASTIGMATISMS GENERATED BY RETURNING BEAMS

BACKGROUND OF THE INVENTION a) Description of the Related Art

The present invention relates to an optical head assembly for recording on and reproducing from optical recording media such as CDs (compact disks) and DVDs (digital video disks).

b) Description of the Related Art

An optical head assembly converges a laser light emitted from a laser light source as an optical spot onto a recording surface of an optical recording medium through an objective lens and detects a returning light reflected upon the optical recording medium through an optical detector to reproduce data recorded on the optical recording medium. During the above operation, the optical head assembly also controls the position of the objective lens in the tracking direction so that the laser light emitted from the laser light source completely scans the track of the recording surface of the optical recording medium, and further controls the position of the objective lens in the focusing direction so that the laser light focuses on the recording surface.

To perform these tracking and focusing controls, the optical data corresponding to tracking errors and focusing errors of the laser light are detected by using the returning light from the optical recording medium.

In general, a three-beam method is employed for detecting tracking errors. With the three-beam method, the laser light is split by a diffraction grating into three beams in the track direction of the recording surface and the like. Of the three beams, the +1st-order beam and −1st-order beam converge at the edge portions of the track. Tracking error signals are generated based on the energy difference between the +1st-order beam and −1st-order beam reflected at the edge portions of the track.

Conventionally an optical system is designed, based on the track pitch of the optical recording medium, for converging the +1st-order beam and −1st-order beam on the recording surface of the optical recording medium. It is designed such that the +1st-order beam and −1st-order beam converge at the edge portions of the track and the phase difference between the +1st-order beam and −1st-order beam is at a maximum in order to obtain the tracking error signals based on the energy difference between +1st-order beam and −1st-order beam.

In conventional optical head assemblies in which the optical system is designed based on the track pitch of the optical recording medium, however, if the track pitches on the recording surfaces are different, the +1st-order beam and −1st-order beam cannot be converged at the edge portions of the track and also the phase difference between the +1st-order beam and −1st-order beam does not reach the above mentioned maximum state (i.e., does not satisfy the above relationship). Therefore, when the track pitch is 1.6 $\mu$m for CD and 0.74 $\mu$m for DVD, the tracking error signals cannot be detected by a common optical system.

OBJECT AND SUMMARY OF THE INVENTION

Then, considering the above problem, the primary objective of the present invention is to provide an optical head assembly in which tracking error signals of optical recording media having different pitches can be detected by a common optical system.

To solve the above problem, the present invention features that, in an optical head assembly having a laser light source, an objective lens for converging the light emitted from the laser light source onto a recording surface of an optical recording medium, and an optical detector means for detecting the light beam reflected upon the recording surface, it comprises a modulating diffraction grating for splitting the light emitted from the laser light source into 0th-order beam, +1st-order beam and −1st-order beam in the track direction, emitting the three beams toward the center of the track of the recording surface, and causing astigmatisms to the +1st-order beam and −1st-order beam in the direction orthogonal to the track direction, and a light-guiding device for guiding three returning beams reflected from the recording surface to the optical detector means; wherein the optical detector means is equipped with an optical detecting portion for detecting recording signals that receives the 0th-order beam of the three returning beams and an optical detecting portion for detecting tracking errors that detects tracking error signals based on the astigmatism generated to the +1st-order beam and −1st-order beam of the three returning beams in the direction orthogonal to the track direction.

In the optical head assembly of the present invention, unlike conventional technology, the +1st-order beam and −1st-order beam of the split three beams are not converged onto the edge portions of the track, but onto the center line of the track in the same manner as the 0th-order beam. Accordingly, even when the track pitch changes, the optical spots of the +1st-order beam and −1st-order beam formed on the track do not need to be changed to be on the edge portions of the track as in a conventional one. For this reason, the tracking error signals for optical recording media of different track pitches can be detected by a common optical system.

In such a method of detecting tracking error signals, even if all the three-split beams are simply converged onto the center line of the track, the tracking error signals caused with the tracking shift of the objective lens cannot be accurately detected. On the other hand, in the optical head assembly of the present invention, astigmatisms having different focal points are generated to the +1st-order beam and −1st-order beam in the direction orthogonal to the track direction so that the accurate tracking error signals can be obtained to control tracking precisely.

To generate tracking error signals, the optical detector for detecting tracking errors may be equipped with a first light-receiving portion in which the light-receiving plane is divided in half for receiving the +1st-order beam of the three returning beams and a second light-receiving portion in which light-receiving plane is divided in half for receiving the −1st-order beam of the three returning beams, and the light-receiving result of each of the light-receiving planes may be computed to cancel the change in received intensity of light beam caused by the tracking shift of the objective lens.

Also focusing error signals may be detected when astigmatisms are generated to the +1st-order beam and −1st-order beam in the track direction by the modulating diffraction grating and the optical detector means is provided with an optical detecting portion for detecting focusing errors that detects focusing error signals based on the astigmatisms generated to the +1st-order beam and −1st-order beam of the three returning beams in the track direction.

BRIEF DESCRIPTION OF THE DRAWINGS

In the drawings:

FIG. 2 illustrates a concept of the operation of the optical system of FIG. 1;

FIG. 4 illustrates a circuit construction for producing various signals; and

FIG. 5 shows changes in intensity of light beam caused by the tracking shift of the objective lens and how the change in intensity of light beam affects the tracking error signals.

DESCRIPTION OF THE PREFERRED EMBODIMENTS

Figure 1A:
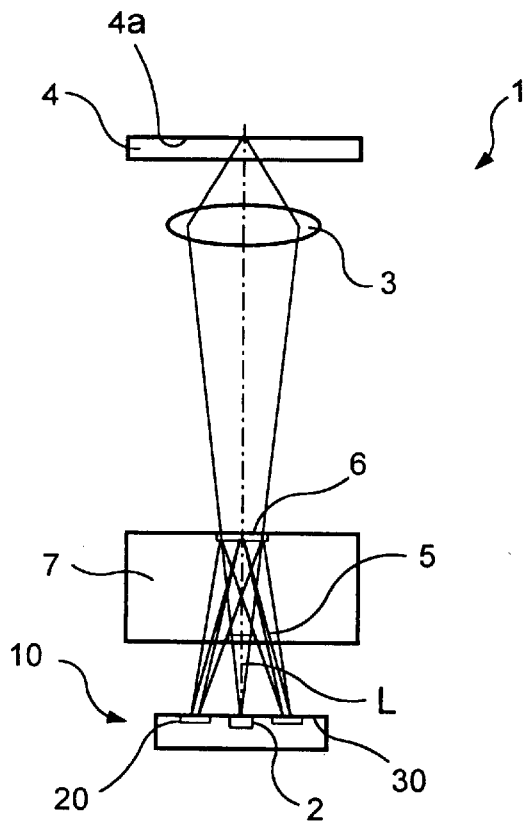
FIG. 1(A) illustrates a simple construction of an optical system of an optical head assembly to which the present invention is applied.

An optical head assembly of the present invention will be described referring to the drawings.

FIG. 1(A) illustrates a simple construction of an optical system in an optical head assembly of the present invention. As illustrated in the figure, optical head assembly 1 comprises a laser diode 2 as a laser light source. Laser light L emitted therefrom is converged through an objective lens 3 onto a recording surface 4a of an optical recording medium 4. The laser diode 2 may be provided such that the laser light L is directly emitted from a substrate toward the objective lens 3 or the laser light L from the laser diode 2 is reflected by a reflecting mirror to the objective lens 3.

On an optical path between the laser diode 2 and objective lens 3, a modulating diffraction grating 5 for splitting the emitted laser light L into three beams, i.e., 0th-order, +1st-order, and −1st-order beams, and a diffraction grating 6 as a light-guiding device for guiding returning beams from the recording surface 4a of the optical recording medium 4 onto a light-receiving plane of the optical detector are placed in this order from the laser diode 2 side. In this embodiment, the modulating diffraction grating 5 is formed on a surface of a glass substrate 7 on the optical detector 10 side, and a diffraction grating 6 is formed on a surface of the glass substrate 7 on the objective lens side.

Figure 1C:
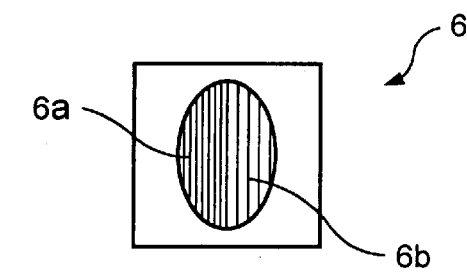
FIG. 1(C) illustrates a diagram of a diffraction pattern of a diffraction grating.
Figure 1B:
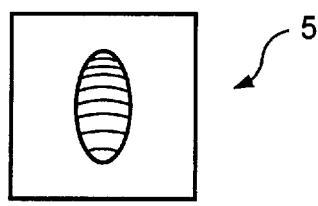
FIG. 1(B) illustrates a diagram of a diffraction pattern of a modulating diffraction grating.

FIGS. 1(B) and 1(C) respectively show a grating pattern of the modulating diffraction grating 5 and a grating pattern of the diffraction grating 6. The diffracting directions of these grating patterns are orthogonal to each other.

In the optical head assembly 1, the laser light L emitted from the laser diode 2 is first diffracted by the modulating diffraction grating 5 and passes through the diffraction grating 6. Since the diffraction pattern of the diffraction grating 6 is designed not to give a diffracting action to the light which has passed through the modulating diffraction grating 5, the laser light L diffracted by the modulating diffraction grating 5 passes through the diffraction grating 6 without being diffracted. The laser light L passing through the diffraction grating 6 is converged by the objective lens 3 onto the recording surface 4a of the optical recording medium 4, reflected thereat and guided through the objective lens 3 to the diffraction grating 6. The returning light guided from the optical recording medium 4 to the diffraction grating 6 is diffracted thereby and then received by the optical detector 10. Based on the intensity of light beam received by the optical detector 10, pit signals (RF signals), tracking error signals (TE signals), focusing error signals (FE signals) and push-pull signals (PP signals) for obtaining the intensity balance of light beam are detected.

Figure 1D:
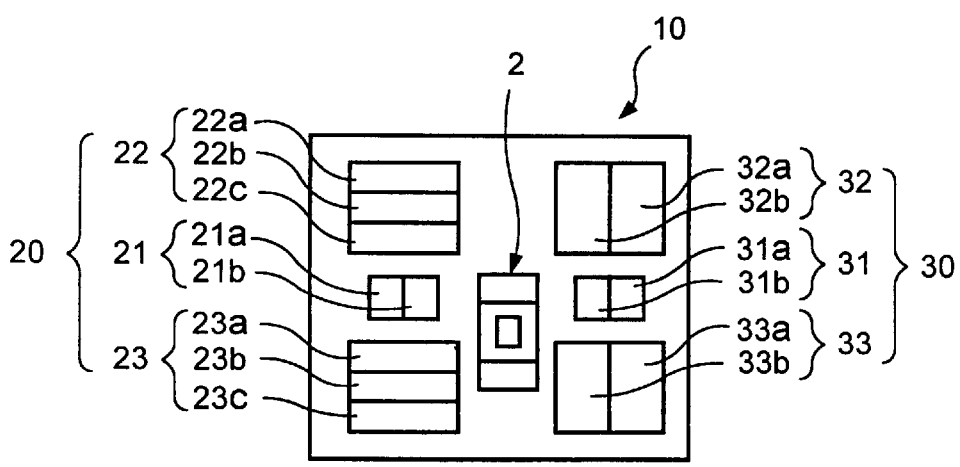
FIG. 1(D) illustrates a construction of an optical detector.

As illustrated in FIG. 1(D), the optical detector 10 has a pair of optical detecting groups 20 and 30 placed symmetric about the laser diode 2. The optical detecting group 20 includes at the center an optical detector 21 for detecting RF signals and PP signals, which is an optical detecting portion for recording signals, and at both sides optical detectors 22 and 23, which are optical detecting portions for focusing error signals. The optical detecting group 30 includes at the center an optical detector 31 for detecting RF signals and PP signals, which is an optical detecting portion for recording signals, and at both sides optical detectors 32 and 33, which are optical detecting portions for tracking error signals.

The optical detectors 21 and 31 for detecting RF signals and PP signals respectively consist of an optical detector split in half in the track direction of the recording surface 4a. In other words, the optical detector 21 has two light-receiving planes 21a and 21b, and in the same manner, the optical detector 31 has two light-receiving planes 31a and 31b.

The optical detectors 22 and 23 for detecting FE signals respectively consist of an optical detector split into three in the direction orthogonal to the track direction of the recording surface 4a. The optical detector 22 has three light-receiving planes 22a, 22b, and 22c. In the same manner, the optical detector 23 has three light-receiving planes 23a, 23b, and 23c.

The optical detectors for detecting TE signals 32 and 33 also respectively consist of an optical detector split in half along the track direction in the same manner as the optical detectors for detecting RF signals 21 and 31. The optical detector 32 has two light-receiving planes 32a and 32b, and the optical detector 33 also has two light-receiving planes 33a and 33b.

FIG. 2 illustrates a diffracting action of the modulating diffraction grating 5 on the emitted light, a diffracting action of the diffraction grating 6 on the returning light, and optical spots formed on the recording surface and the light-receiving planes of the optical detectors. FIG. 3 illustrates the optical spots formed on the recording surface in detail.

10 Referring to FIGS. 1(A)–(D), FIG. 2, and FIGS. 3(A)–(D), the optical movement of detecting signals in the optical head assembly 1 will be described. The laser light L emitted from the laser diode 2 enters the modulating diffraction grating 5. The laser light L incident on the modulating diffraction grating 5 is given a diffracting action by the modulating diffraction grating 5 to be split into three beams, 0th-order beam L(0), +1st-order beam L(+1) and −1st-order beam L(−1). The diffraction pattern of the modulating diffraction grating 5 is formed such that the diffracting direction is in the track direction.

These three beams pass through the diffraction grating 6 without being affected, and then are converged by the objective lens 3 as optical spots a, b, and c onto the desired track 4b formed on the recording surface 4a of the optical recording medium 4. The optical head assembly is set so as to form each of the optical spots a, b, and c on the center line 40L of the track 4b, i.e., at the center of the track 4b.

The three returning beams, Lr(0), Lr(+1), and Lr(−1), reflected from the recording surface 4a of the optical recording medium 4 pass through the objective lens 3 and again enter the diffraction grating 6. As illustrated in FIG. 1(C), the diffraction grating 6 has first and second diffraction areas 6a and 6b split in the track direction. The grating pitch of the first diffraction area 6a is set narrower than that of the second diffraction area 6b. Consequently, the three returning beams Lr(0), Lr(+1) and Lr(−1) are respectively split into two diffracted beams at the first and second diffraction areas 6a and 6b.

More specifically, the 0th-order beam Lr(0) of the three returning beams is diffracted such that the optical components thereof incident on the first diffraction area 6a is diffracted outward to respectively be the +1st-order beam Lr1(0)+1 and the −1st-order beam Lr1(0)−1 and the other optical components incident on the second diffraction area 6b are diffracted inner than those by the first diffraction area 6a to be the +1st-order beam Lr2(0)+1 and the −1st-order beam Lr2(0)−1. This occurs because the diffraction pitch of the second diffraction area 6b is wider than that of the first diffraction area 6a.

Also the returning beam of +1st-order beam Lr(+1) of the three returning beams incident on the diffraction grating 6 is diffracted such that the optical components thereof incident on the first diffraction area 6a are diffracted outward to be the +1st-order beam Lr1(+1)+1 and the −1st-order beam Lr1(+1)−1, and the other optical components incident on the second diffraction area 6b are diffracted inner than those by the first diffraction area 6a to be the +1st-order beam Lr2(+1)+1 and the −1st-order beam Lr2(+1)−1.

Further, the −1st-order returning beam Lr(−1) of the three returning beams incident on the diffraction grating 6 is diffracted such that the optical components thereof incident on the first diffraction area 6a are diffracted outward to be the +1st-order beam Lr1(−1)+1 and the −1st-order beam Lr1(−1)−1, and the other optical components incident on the second diffraction area 6b are diffracted to be the +1st-order beam Lr2(−1)+1 and the −1st-order beam Lr2(−1)−1.

Of the +1st-order beams and −1st-order beams, the −1st-order beams Lr1(+1)−1 and Lr2(+1)−1 respectively converge as optical spots a1 and a2 over the light-receiving planes 23a, 23b, 23c of the optical detector 23. The −1st-order beams Lr1(−1)−1 and Lr2(−1)−1 respectively converge as optical spots c1 and c2 over the light-receiving planes 22a, 22b, 22c of the optical detector 22. The −1st-order beam Lr1(0)−1 of the 0th-order beam Lr(0) converges as an optical spot b1 onto the outer light receiving plane 21a of the optical detector 21. The −1st-order beam Lr2(0)−1 converges as an optical spot b2 on the inner light-receiving plane 21b of the optical detector 21.

On the other hand, the +1st-order beam Lr1(0)+1 of the 0th-order beam Lr(0) converges as an optical spot b3 onto the outer light-receiving plane 31a of the optical detector 31, and the +1st-order beam Lr2(0)+1 converges as an optical spot b4 onto the inner light-receiving plane 31b of the optical detector 31.

Also, the +1st-order beam Lr1(+1)+1 converges as an optical spot a3 onto the outer light receiving plane 33b of the optical detector 33, and the +1st-order beam Lr2(+1)+1 converges as an optical spot a4 onto the inner light-receiving plane 33b of the optical detector 33. The +1st-order beam Lr1(−1)+1 converges as an optical spot c3 onto the outer light receiving plane 32a of the optical detector 32, and the +1st-order beam Lr2(−1)+1 converges as an optical spot c4 onto the inner light-receiving plane 32b of the optical detector 32.

The light-receiving planes 33a and 33b of the optical detector 33 are the optical detecting portions for detecting tracking errors and constitute the first light-receiving portion in which the light receiving plane for receiving the +1st order beam of the three returning beams is divided in half. In the same manner, the light-receiving planes 32a and 32b of the optical detector 32 are the optical detecting portions for detecting tracking errors and constitute the second light-receiving portion in which the light receiving planes for receiving −1st order beam of the three returning beams is divided in half.

Note that the optical path length between the diffraction grating 6 and modulating diffraction grating 5 is set such that the +1st-order beam and 1st order beam of the returning beams diffracted by the diffracted grating 6 do not pass through the modulating diffraction grating 5.

FIGS. 3(A), 3(B), 3(C), and 3(D) respectively illustrate the shapes of the optical spots formed on the track, the light beams in meridianal cross-sectional view, the light beams in sagittal cross-sectional view, and the energy distributions at the pupil plane of the objective lens.

In the optical head assembly 1, as illustrated in FIG. 1(B), the modulating diffraction grating 5 has an arc grating pattern of different grating pitches. For this reason, the laser light L emitted from the laser diode 2 is split by the modulating diffraction grating 5 into three beams in the track direction. Also astigmatism is generated to each of the +1st-order beam L(+1) and −1st order beam L(−1) of the three split beams in the track direction and the direction orthogonal to the track direction. These astigmatisms generated to the +1st-order beam L(+1) and −1st-order beam L(−1) are different in focal point from each other in focal points.

Figure 3A:
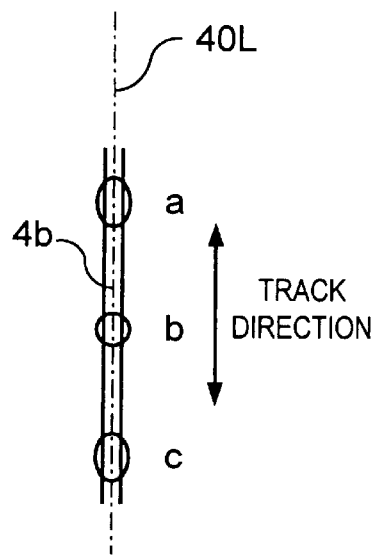
FIG. 3(A) illustrates shapes of the optical spots formed on the track.
Figure 3B:
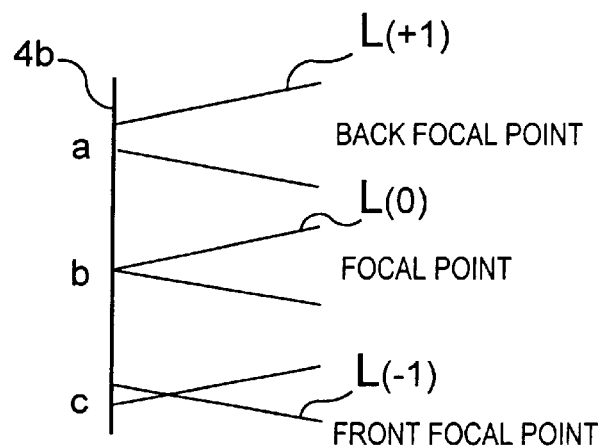
FIG. 3(B) illustrates states of the light in meridianal cross-section.
Figure 3C:
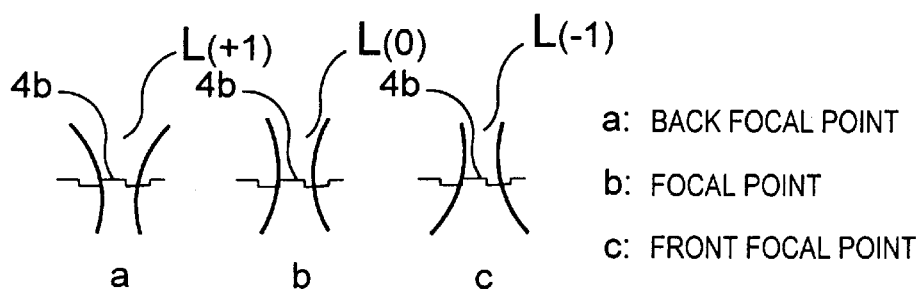
FIG. 3(C) illustrates states of the light in sagittal cross-section.

As a result, as illustrated in FIGS. 3(A), 3(B), and 3(C), the 0th-order beam L(0) which has not been modulated by the modulating diffraction grating 5 converges as an almost circular optical spot b onto the center line 40L of the track 4b at the focal state.

On the other hand, the +1st-order beam L(+1) emitted from the laser diode 2 is given an astigmatism in the track direction by the modulating diffraction grating 5 and is in a back focal point (back focal state) on the track 4b in a meridianal cross-sectional view as illustrated in FIG. 3(B). Since the +1st-order beam L(+1) is also given an astigmatism in the direction orthogonal to the track direction by the modulating diffraction grating 5, it is in a back focal point (back focal state) on the track 4b in a sagittal cross-sectional view as illustrated in FIG. 3(C). As a result, the +1st-order beam L(+1) converges as an oval optical spot a elongated in the track direction on the center line 40L of the track 4b.

The −1st-order beam L(−1) is given an astigmatism in the track direction through the modulating diffraction grating 5, and also the given astigmatism is different in focal point from that of the +1st-order beam L(+1). For this reason, as understood from FIG. 3(B), the light is in the front focal point (front focal state) on the track 4b in a meridianal cross-sectional view. As mentioned above, the −1st-order beam L(−1) is given an astigmatism in the direction orthogonal to the track direction through the modulating diffraction grating 5, and at the same time, the given astigmatism is different in focal point from that of the +1st-order beam L(+1). Therefore, as understood from FIG. 3(C), the −1st-order beam L(−1) is in a front focal point (front focal state) on the track 4b in a sagittal cross-sectional view. Consequently, the −1st-order beam L(−1) also converges as an oval optical spot c elongated in the track direction onto the center line 40L of the track 4b.

Figure 3D:
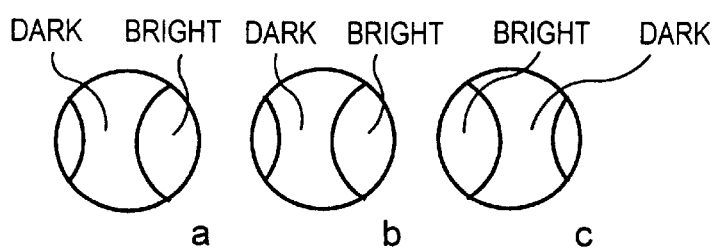
FIG. 3(D) illustrates energy distributions of the three returning beams from a recording surface at an objective lens pupil plane.

As illustrated in FIGS. 3(C) and 3(D), in the optical head assembly 1, when the optical spot b of the 0th-order beam L(0) is displaced to the left from the center line 40L of the track 4b, the +1st-order beam L(+1) of the laser light emitted from the laser diode 2 is in a back focal point and the −1st-order beam L(−1) is in a front focal point. Therefore, the energy distributions of the +1st-order beam Lr(+1) and −1st order beam Lr(−1), which are reflected at the recording surface 4 and again enter the objective lens 4, are opposite each other. In other words, the energy distributions of the +1st-order beam Lr(+1) and −1st order beam Lr(+1) change according to the focusing point on the track of the optical spot b of the 0th-order beam L(0). And at the same time, the energy distributions of the +1st-order beam Lr(+1) and −1st order beam Lr(+1) are in an opposite relationship.

According to the above, TE signals can be produced by detecting the energy distributions of the +1st-order beam Lr(+1) and −1st order beam Lr(+1) of the light emitted from the laser diode 2 as changes in the intensity of light beam that each of the optical detectors receives. That is, as illustrated in FIG. 4, the sum S1 is taken between the light intensity c3 received on the outer light-receiving plane 32a of the two-split type optical detector 32 (a left half of the optical spot c) and the light intensity a4 received on the inner light-receiving plane 33b of the two-split type optical detector 33 (a left half of the optical spot a) which is placed opposite the optical detector 32 having the optical detector 31 therebetween. The sum S2 is taken between the light intensity c4 received on the inner light-receiving plane 32b of the two-split type optical detector 32 (a right half of the optical spot c) and the light intensity a3 received on the outer light-receiving plane 33a of the two-split type optical detector 33 (a right half of the optical spot a). Then, the difference between the sum signals S1 and S2 is calculated to produce TE signals.

When the optical spot b of the 0th-order beam L(0) is on the center line 40L of the track 4b and in the best state, the energy distributions of the 0th-order beam Lr(0), the +1st-order beam Lr(+1) and −1st order beam Lr(−1) of the three returning beams become almost equal. Each energy distribution becomes symmetric. Therefore, the tracking error signals are not generated in this case.

In this manner, the optical head assembly 1 does not converge the +1st-order beam L(+1) and −1st order beam L(−1) of the three-split beams at the edge portions of the track, but converges them on the center line 40L of the track 4b in the same manner as the 0th-order beam L(0) to detect the tracking error signals TE. Therefore, even when the track pitch changes, the spot forming locations of the optical spots a and c of the +1st-order beam L(+1) and −1st order beam L(−1) formed on the track do not need to be changed to adjust these locations onto the edge portions of the track 4b. For this reason, the tracking error signals of the optical recording media of different track pitch, such as CDs and DVDs, can be detected by a common optical system.

In the optical head assembly 1, a portion of the +1st-order returning beam and −1st-order returning beam may be cut accompanying the tracking shift of the objective lens 3 to converge all the three-split beams on the center line 40L of the track 4b, and accordingly the intensity of light beam received on the optical detector may deviate. FIG. 5 illustrates optical spots formed on each of the light-receiving planes of the optical detectors in the optical detecting group 30 when the objective lens 3 is shifted for tracking to the right in the figure and a portion of the +1st-order returning beam and −1st order returning beam is cut in the optical system of FIG. 1(a).

As above, when the objective lens 3 is shifted to the right, a portion of the light converged at the outer light-receiving planes 32a and 33a of the optical detectors 32 and 33 on the first diffraction area 6a is cut in crescent as shown by broken lines in FIG. 5. Thus, the received intensity of light beam changes on the light receiving planes 32a and 33a. The optical head assembly 1 can compute so as to cancel the change in intensity of light beam caused by the tracking shift of the objective lens 3, by taking the intensity of light beam received on the light-receiving plane 32a as a portion of the sum signal S1 so that the change in intensity of light beam caused with the tracking shift of the objective lens 3 is prevented from affecting the tracking error signals. Note that, when the objective lens 3 is shifted to the left for tracking, the tracking error signals are kept from being affected in the same manner as the case when the objective lens 3 is shifted to the right for tracking.

In this manner, in the optical head assembly 1, even when the three beams split through the modulating diffraction grating 5 are together converged on the center line 40L of the track 4b, the accuracy of the tracking error signals can be avoided from degrading, which is normally caused by the change in the intensity of light beam caused by the offset of the objective lens 3. Therefore, the tracking error signals of the optical recording media having different track pitches can be detected accurately, thus precisely controlling the position of the objective lens 3 in the tracking direction.

Next the operation of producing the focusing error signals in the optical head assembly 1 will be described. In the optical head assembly 1, astigmatisms having different focal points are given to the +1st-order beam L(+1) and −1st order beam L(−1) in the track direction by the modulating diffraction grating 5. Accordingly, the optical spots c1 and c2 formed over the light-receiving planes 22a, 22b, and 22c of the three-split type optical detector 22 and the optical spots a1 and a2 formed over the light-receiving planes 23a, 23b, and 23c of the three-split type optical detector 23 change the spot shapes thereof depending on the direction and amount of the focusing displacement.

Therefore, the optical head assembly 1 detects the changes in intensity of light beam of these optical spots a1, a2, c1, and c2 to produce the focusing error signals. Specifically, as illustrated in FIG. 4, the sum S3 is taken between the intensity of light beam received on the light-receiving planes 22a and 22c at both sides of the three-split type optical detector 22 and the intensity of light beam received on the light-receiving plane 23b in the center of the three-split type optical detector 23 arranged opposite the optical detector 22, putting the optical detector 21 therebetween. Also, the sum S4 is taken of the intensity of light beam received on the light-receiving plane 22b in the center of the three-split type optical detector 22 and the intensity of light beam received on the light-receiving planes 23a and 23c at both sides of the three-split type optical detector 23. Then, by calculating the difference between the sum signals S3 and S4, the focusing error signals EF can be produced.

In the optical head assembly 1, RF signals and PP signals are produced through the two-split type optical detectors 21 located between the three-split type optical detectors 22 and 23 and the two-split type optical detector 31 located between the two-split type optical detector 32 and 33.

In other words, RF signals can be produced by taking the sum of the intensity of light beam received on the light-receiving planes 21*a*, 21*b*, 31*a*, and 31*b* of the two-split type optical detectors 21 and 31. PP signals can be produced by taking the difference between the sum of the intensity of light beam received on the outer light-receiving planes 21*a* and 31*a* of the two-split type optical detectors 21 and 31 and the sum of the intensity of light beam received on the inner light-receiving planes 21*b* and 31*b* of the two-split type optical detectors 21 and 31.

As described the above, in the optical head assembly of the present invention, astigmatisms having different focal points are given to the +1st-order beam and −1st order beam of the three split beams in the direction orthogonal to the track direction so that the +1st-order beam and +1st order beam are not converged at the edge portions of the track but on the center line of the track in the same manner as the 0th-order beam to obtain the tracking error signals. Therefore, even when the track pitch changes, the locations for forming the spots of the +1st-order beam and −1st-order beam formed on the track do not need to be changed to adjust the locations of the optical spots onto the edge portions of the track. Therefore, the tracking error signals of the optical recording media of different track pitches can be detected by a common optical system.

While the foregoing description and drawings represent the preferred embodiments of the present invention, it will be obvious to those skilled in the art that various changes and modifications may be made therein without departing from the true spirit and scope of the present invention.

What is claimed is:

1. An optical head assembly comprising:

a laser light source;

an objective lens for converging light emitted from said laser light source onto a recording surface of an optical recording medium;

an optical detector means for detecting the light reflected upon said recording surface;

a modulating diffraction grating for splitting said light emitted from said laser light source into a 0th-order beam, a +1st-order beam and a −1st-order beam in a track direction of said recording surface, emitting said three beams toward the center of said track of said recording surface and causing, with respect to said +1st-order beam and −1st-order beam, astigmatisms of different focal points in a direction orthogonal to said track direction; and a light-guiding device for guiding three returning beams reflected from said recording surface to said optical detector means;

said optical detector means being equipped with an optical detecting portion for detecting recording signals that receives said 0th-order beam of said three returning beams and an optical detecting portion for detecting tracking errors that detects tracking error signals based on said astigmatisms generated to +1st-order beam and −1st-order beam of said three returning beams, said astigmatisms having different focal points in said direction orthogonal to said track direction;

said optical detecting portion for detecting tracking errors having a first light-receiving portion in which a light-receiving plane is divided in half for receiving the +1st-order beam of said three returning beams and a second light-receiving portion in which a light-receiving plane is divided in half for receiving the −1st-order beam of said three returning beams, the light-receiving result on each of said light-receiving planes being computed to cancel the change in the received intensity of light beam caused by a tracking shift of said objective lens so that said tracking error signals are detected.

2. The optical head assembly as set forth in claim 1 wherein said modulating diffraction grating is configured to converge said +1st-order beam or said −1st-order beam onto said recording surface in a back focal point and the other of said +1st-order beam and −1st-order beam at a front focal point in said direction orthogonal to said track direction.

3. The optical head assembly as set forth in claim 2 wherein said diffraction grating of said modulating diffraction grating is formed so as to generate astigmatism to said +1st-order beam and −1st-order beam even in said track direction, and wherein said optical detecting means further includes an optical detecting portion for detecting focusing errors that detects focusing error signals based on said astigmatisms generated to +1st-order beam and −1st-order beam of said three returning beams in said track direction.

4. The optical head assembly as set forth in claim 1 wherein said modulating diffraction grating is configured so as to converge one of said +1st-order beam and −1st-order beam in a back focal point and the other at a front focal point in both said track direction and said direction orthogonal to said track direction.

5. The optical head assembly as set forth in claim 4 wherein said modulating diffraction grating has an arc grating pattern having different grating pitches.

6. An optical head assembly comprising:

a laser light source;

an objective lens for converging light emitted from said laser light source onto a recording surface of an optical recording medium;

an optical detector means for detecting the light reflected upon said recording surface;

a modulating diffraction grating for splitting said light emitted from said laser light source into a 0th-order beam, a +1st-order beam and a −1st-order beam in a track direction of said recording surface, emitting said three beams toward the center of said track of said recording surface, and causing, with respect to said +1st-order beam and −1st-order beam, astigmatisms of different focal points in a direction orthogonal to said track direction; and a light-guiding device for guiding three returning beams reflected from said recording surface to said optical detector means;

said optical detector means being equipped with an optical detecting portion for detecting recording signals that receives said 0th-order beam of said three returning beams and an optical detecting portion for detecting tracking errors that detects tracking error signals based on said astigmatisms generated to said +1st-order beam and −1st-order beam of said three returning beams, said astigmatisms having different focal points in said direction orthogonal to said track direction;

said light-guiding device having first and second diffraction areas which are respectively split in half along said track direction, each of said first and second diffraction areas being configured to form two diffracted beams, said optical detecting portion for detecting tracking errors having a first light-receiving portion in which a light-receiving plane is divided in half for receiving said two diffracted beams formed from the +1st-order beam of said three returning beams and a second light-receiving portion in which a light-receiving plane is divided in half for receiving said two diffracted beams formed from the −1st-order beam of said three returning beams.

7. The optical head assembly as set forth in claim 6 wherein said light-guiding device is formed to transmit, without giving a diffracting action, said thee beams which are split by said modulating diffraction grating and going toward said recording surface.

8. The optical head assembly as set forth in claim 7 wherein said light-guiding device is configured in that an optical path length between said light-guiding device and said modulating diffraction grating is set such that said +1st-order and −1st-order returning beams diffracted at said first and second diffraction areas do not pass through said modulating diffraction grating.

9. The optical head assembly as set forth in claim 8 wherein said light-guiding device and said modulating diffraction grating are formed on opposite surfaces of a glass substrate.

10. The optical head assembly as set forth in claim 6 wherein said first diffraction areas and said second diffraction areas have different grating pitches with respect each other.

11. An optical head assembly comprising:

a laser light source;

an objective lens for converging light emitted from said laser light source onto a recording surface of an optical recording medium;

an optical detector means for detecting the light reflected upon said recording surface;

a modulating diffraction grating for splitting said light emitted from said laser light source into a 0th-order beam, a +1st-order beam and a −1st-order beam in a track direction of said recording surface, emitting said three beams toward the center of said track of said recording surface, and causing, with respect to said +1st-order beam and −1st-order beam, astigmatisms of different focal points in a direction orthogonal to said track direction; and a light-guiding device for guiding three returning beams reflected from said recording surface to said optical detector means;

said optical detector means being equipped with an optical detecting portion for detecting recording signals that receives said 0th-order beam of said three returning beams and an optical detecting portion for detecting tracking errors that detects tracking error signals based on the light-receiving result of said +1st-order beam and −1st-order beam in accordance with said different focal points in said direction orthogonal to said track direction;

said modulating diffraction grating being configured to converge one of said +1st-order beam and said −1st-order beam onto said recording surface in a back focal point and the other of said +1st-order beam and −1st-order beam at a front focal point in said direction orthogonal to said track direction, said light-guiding device having first and second diffraction areas which are respectively split in half along said track direction, each of said first and second diffraction areas being configured to form two diffracted beams, said optical detecting portion for detecting tracking errors having a first light-receiving portion in which a light-receiving plane is divided in half for receiving said two diffracted beams formed from the +1st-order beam of said three returning beams and a second light-receiving portion in which a light-receiving plane is divided in half for receiving said two diffracted beams formed from the −1st-order beam of said three returning beams.

* * * * *